United States Patent
Lee et al.

(10) Patent No.: US 11,482,757 B2
(45) Date of Patent: Oct. 25, 2022

(54) RECHARGEABLE BATTERY

(71) Applicant: Samsung SDI Co., Ltd., Yongin-si (KR)

(72) Inventors: Hyunsoo Lee, Yongin-si (KR); Sangwon Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/323,687

(22) PCT Filed: Sep. 4, 2017

(86) PCT No.: PCT/KR2017/009660
§ 371 (c)(1),
(2) Date: Feb. 6, 2019

(87) PCT Pub. No.: WO2018/048159
PCT Pub. Date: Mar. 15, 2018

(65) Prior Publication Data
US 2019/0207185 A1    Jul. 4, 2019

(30) Foreign Application Priority Data

Sep. 6, 2016    (KR) ........................ 10-2016-0114635

(51) Int. Cl.
*H01M 50/30* (2021.01)
*H01M 50/147* (2021.01)
(Continued)

(52) U.S. Cl.
CPC ....... *H01M 50/394* (2021.01); *H01M 50/147* (2021.01); *H01M 50/30* (2021.01); *H01M 50/531* (2021.01); *H01M 50/54* (2021.01)

(58) Field of Classification Search
None
See application file for complete search history.

(56) References Cited

U.S. PATENT DOCUMENTS 8,367,242 B2 * 2/2013 Byun .................. H01M 2/0469
429/122
2007/0154782 A1 7/2007 Cho et al.
(Continued)

FOREIGN PATENT DOCUMENTS

CN          2884545 Y     3/2007
CN         102170011 A     8/2011
(Continued)

OTHER PUBLICATIONS

Extended European Patent Office Search Report for corresponding European Patent Application No. 17849043.9, dated Jan. 30, 2020, 6 pages.
(Continued)

*Primary Examiner* — Ula C Ruddock
*Assistant Examiner* — Amanda Rosenbaum
(74) *Attorney, Agent, or Firm* — Lewis Roca Rothgerber Christie LLP

(57) ABSTRACT

A rechargeable battery includes: an electrode assembly formed by disposing first and second electrodes on either side of each separator, the first and second electrodes each having coated regions and uncoated region tabs; a case for accommodating the electrode assembly; and a cap plate attached to an opening of the case to close and seal the case and having a vent plate formed integrally with a vent hole, wherein the vent plate is formed beyond the thickness of the cap plate.

10 Claims, 6 Drawing Sheets

(51) Int. Cl.
H01M 50/531 (2021.01)
H01M 50/54 (2021.01)

(56) References Cited

U.S. PATENT DOCUMENTS

| | | | | |
|---|---|---|---|---|
| 2009/0148753 | A1* | 6/2009 | Jeon | H01M 2/0413 429/53 |
| 2010/0266879 | A1 | 10/2010 | Byun et al. | |
| 2011/0212350 | A1* | 9/2011 | Sato | H01M 2/0404 429/56 |
| 2012/0021277 | A1 | 1/2012 | Byun et al. | |
| 2012/0040214 | A1 | 2/2012 | Kim et al. | |
| 2012/0231305 | A1* | 9/2012 | Guen | H01M 50/60 429/53 |
| 2012/0276442 | A1 | 11/2012 | Kim et al. | |
| 2014/0141293 | A1 | 5/2014 | Urano et al. | |
| 2015/0340663 | A1* | 11/2015 | Minagata | H01M 10/0413 429/163 |
| 2016/0049633 | A1 | 2/2016 | Kang | |
| 2016/0099440 | A1 | 4/2016 | Park et al. | |
| 2016/0204463 | A1 | 7/2016 | Lee et al. | |

FOREIGN PATENT DOCUMENTS

| | | | |
|---|---|---|---|
| CN | 102376925 | A | 3/2012 |
| CN | 102760855 | A | 10/2012 |
| CN | 104380500 | A | 2/2015 |
| CN | 105789493 | A | 7/2016 |
| EP | 2 738 836 | A1 | 6/2014 |
| EP | 2 988 349 | A2 | 2/2016 |
| JP | 2002-40392 | A | 2/2002 |
| JP | 4468290 | B2 | 5/2010 |
| KR | 10-0824850 | B1 | 4/2008 |
| KR | 10-1030916 | B1 | 4/2011 |
| KR | 10-1084056 | B1 | 11/2011 |
| KR | 10-2012-0016022 | A | 2/2012 |
| KR | 10-2012-0039796 | A | 4/2012 |
| KR | 10-1471958 | B1 | 12/2014 |
| KR | 10-2016-0042245 | A | 4/2016 |

OTHER PUBLICATIONS

Chinese Office Action, with English translation, dated Feb. 3, 2021, issued in corresponding Chinese Patent Application No. 201780051270.7 (18 pages).

Chinese Office Action, with English translation, dated Aug. 4, 2021, issued in corresponding Chinese Patent Application No. 201780051270.7 (23 pages).

Chinese Office Action dated Jan. 26, 2022, issued in Chinese Patent Application No. 201780051270.7 (with English translation) (21 pages).

EPO Office Action dated Jan. 5, 2022, for corresponding European Patent Application No. 17849043.9 (4 pages).

Chinese Notice of Allowance, with English translation, dated May 24, 2022, issued in corresponding Chinese Patent Application No. 201780051270.7 (6 pages).

* cited by examiner

[Figure 1]
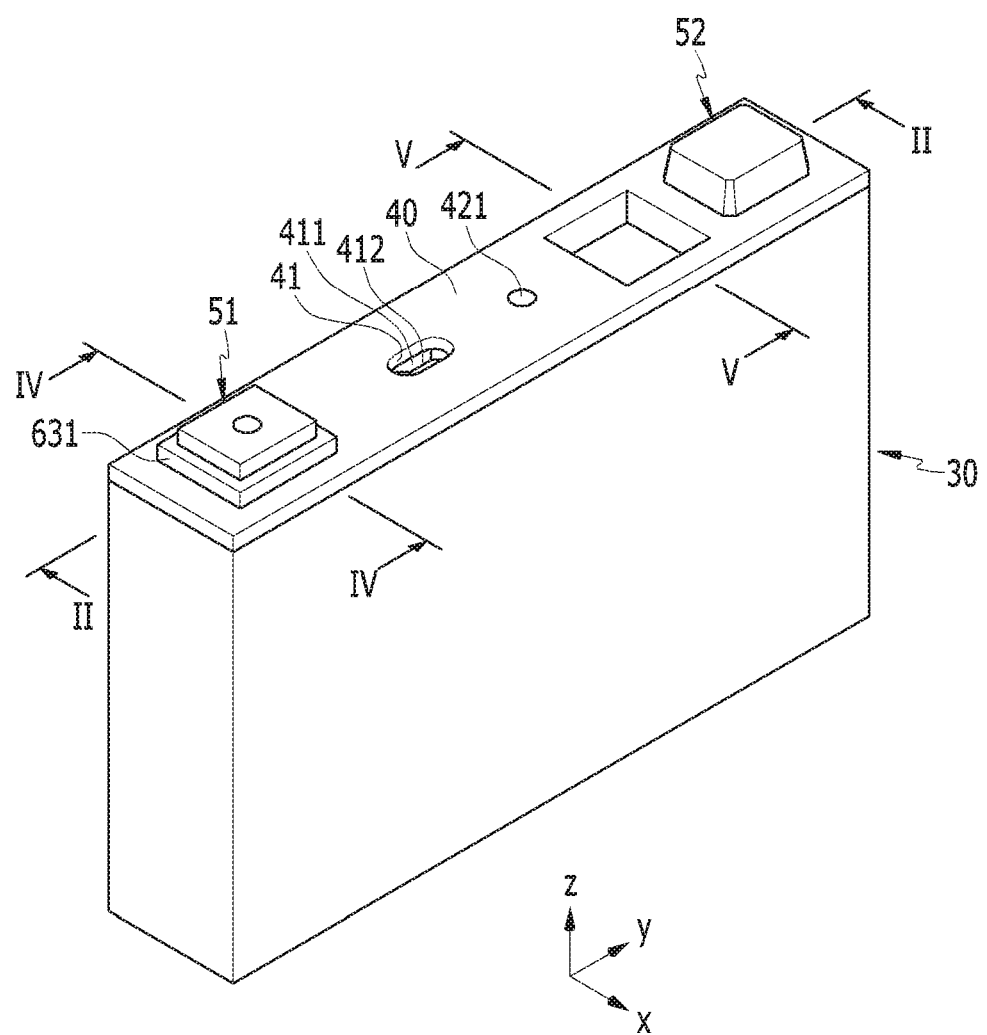

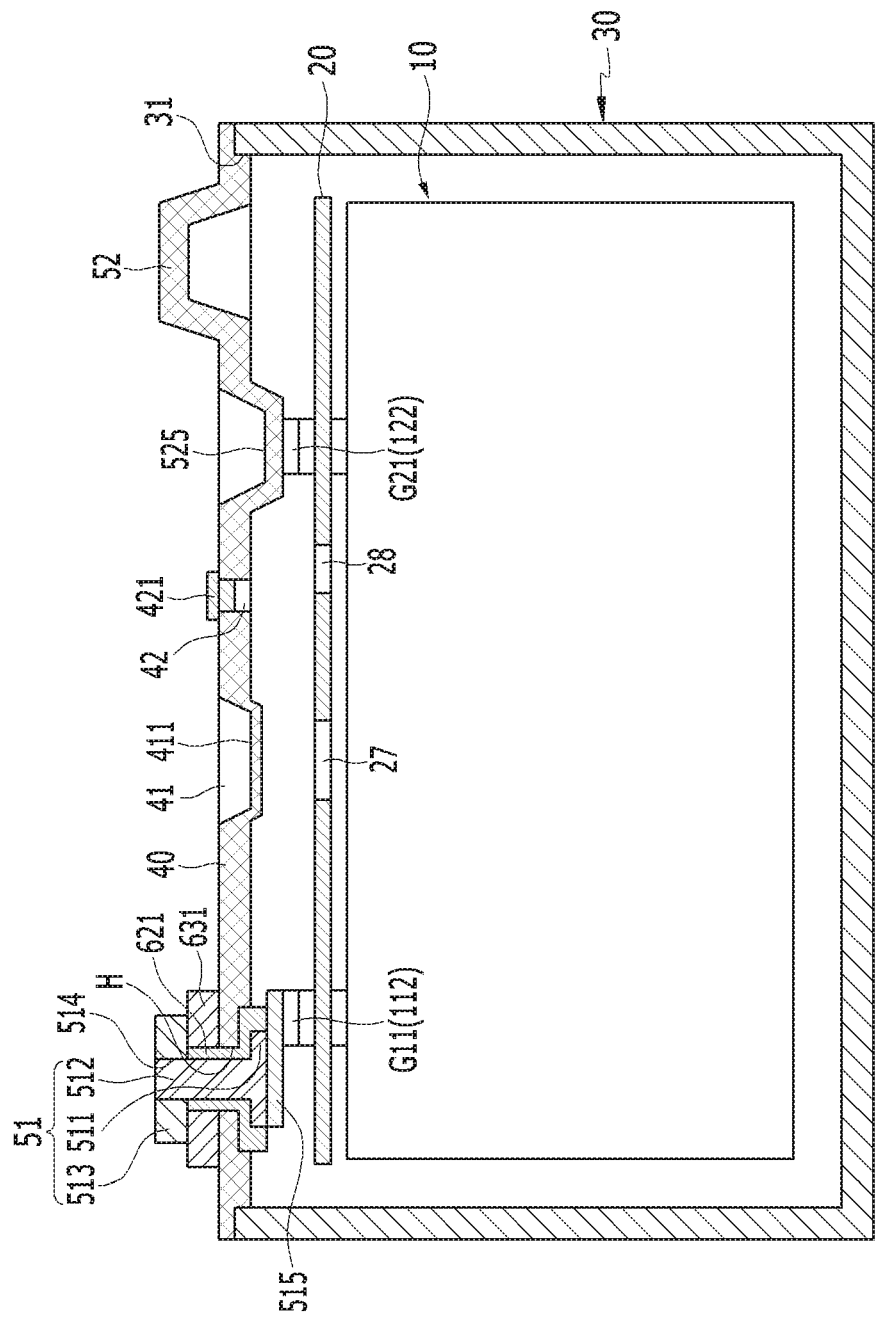
[Figure 2]

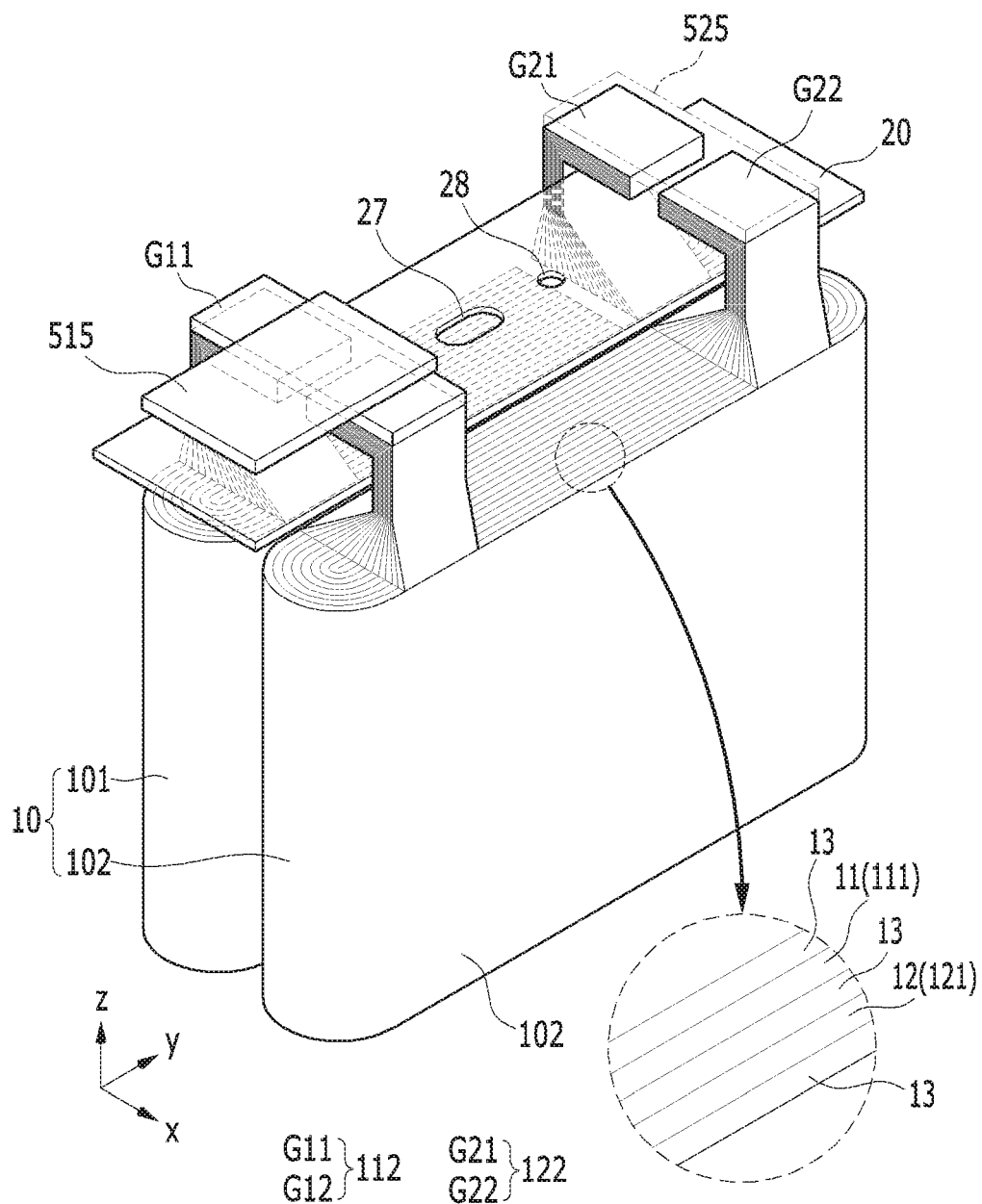
[Figure 3]

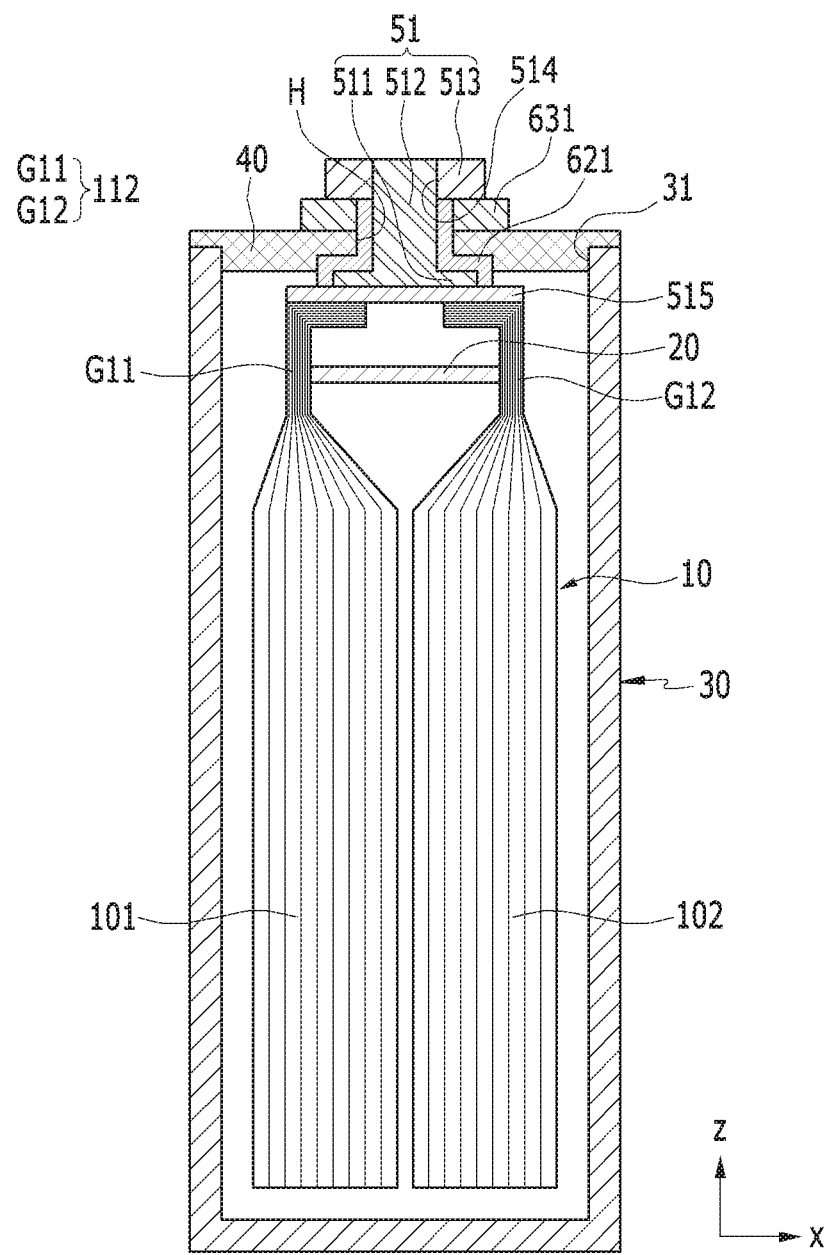
[Figure 4]

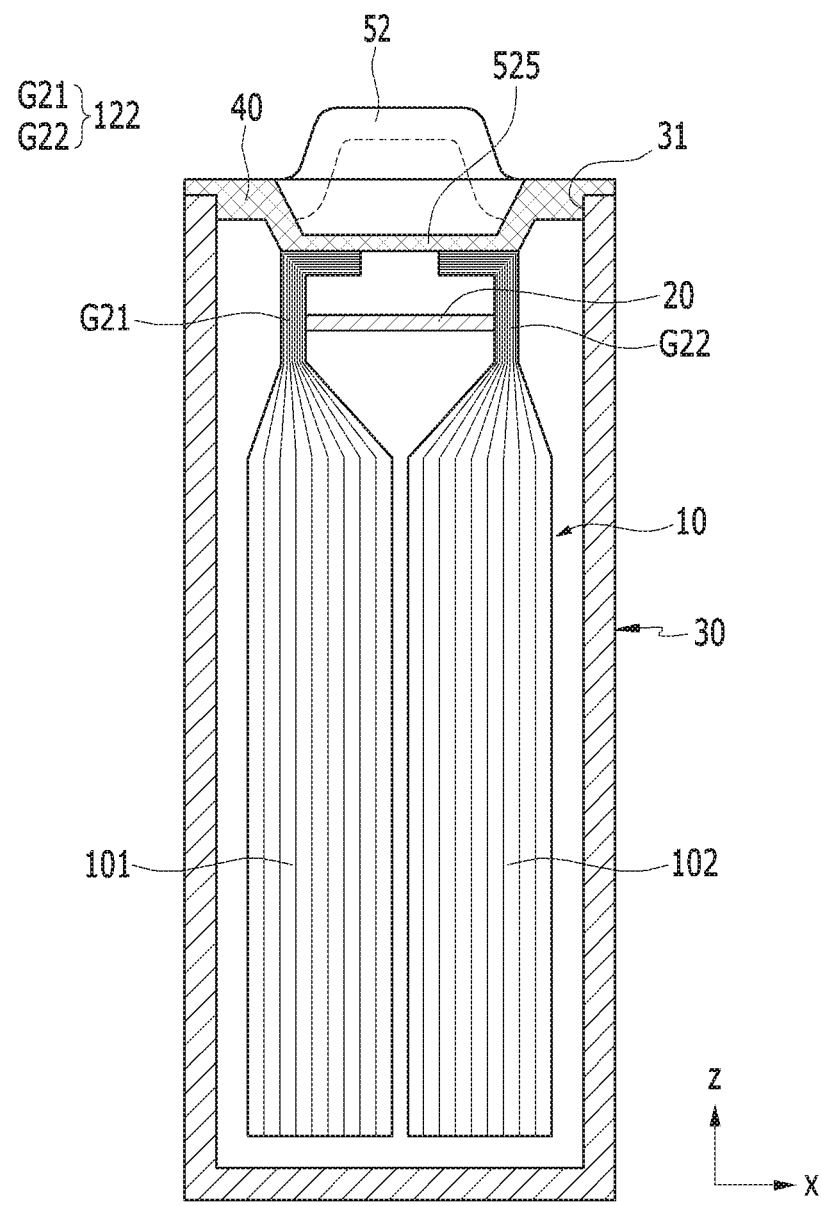
[Figure 5]

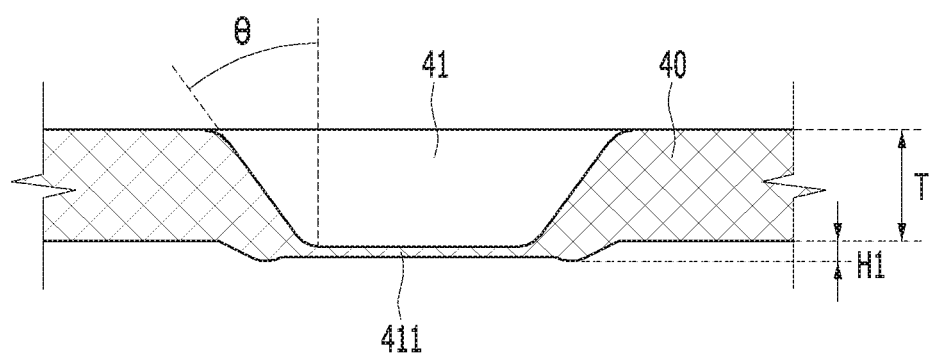
[Figure 6]

RECHARGEABLE BATTERY

CROSS-REFERENCE TO RELATED APPLICATION(S)

This application is a National Phase Patent Application of International Patent Application Number PCT/KR2017/009660, filed on Sep. 4, 2017, which claims priority of Korean Patent Application No. 10-2016-0114635, filed Sep. 6, 2016. The entire contents of both of which are incorporated herein by reference.

TECHNICAL FIELD

The present invention relates to a rechargeable battery, and more particularly, to a rechargeable battery that integrates elements configured on a cap plate.

BACKGROUND ART

A rechargeable battery is a type of battery which can be charged and discharged repeatedly, as opposed to a primary battery. Small-capacity rechargeable batteries may be used in small portable electronic devices such as mobile phones, laptop computers, and camcorders. Large-capacity rechargeable batteries may be used as power supplies for driving motors for hybrid vehicles and electric vehicles.

For example, a rechargeable battery includes an electrode assembly for performing charging and discharging operations, a case for accommodating the electrode assembly, a cap plate attached to an opening of the case, an electrode terminal for drawing the electrode assembly out of the cap plate, and a vent plate for releasing an internally generated, high-temperature gas and its pressure.

The cap plate has a terminal hole for attaching the electrode terminal and a vent hole for installing the vent plate. In addition, a current collecting member is used to connect the electrode terminal to the electrode assembly. The terminal hole, vent hole, and current collecting member cause an increase in the number of elements and make the configuration of the cap plate complicated, thereby increasing the cost of the rechargeable battery.

DISCLOSURE

Technical Problem

The present invention has been made in an effort to provide a rechargeable battery that has a simple configuration by integrating elements configured on a cap plate.

Technical Solution

An exemplary embodiment of the present invention provides a rechargeable battery including: an electrode assembly formed by disposing first and second electrodes on either side of each separator, the first and second electrodes each having coated regions and uncoated region tabs; a case for accommodating the electrode assembly; and a cap plate attached to an opening of the case to close and seal the case and having a vent plate formed integrally with a vent hole, wherein the vent plate is formed beyond the thickness of the cap plate.

The vent plate may protrude toward the electrode assembly by a height from the inner surface of the cap plate.

The rechargeable battery according to the exemplary embodiment of the present invention may further include: a first electrode terminal connected to the uncoated region tabs of the first electrodes and installed with a gasket placed in a terminal hole of the cap plate; and a second electrode terminal connected to the uncoated region tabs of the second electrodes and formed integrally with the cap plate.

The first electrode terminal may include: a rivet portion installed with the gasket placed in the terminal hole; an external plate installed around the exposed end of the rivet portion and connected to the rivet portion; and an internal plate integrally connected to the underside of the rivet portion and connected to the uncoated region tabs of the first electrodes, with a current collecting member placed in between.

The electrode assembly may include a first assembly and a second assembly arranged side by side along the width of the cap plate, and the uncoated region tabs of the first electrodes may include an eleventh tab group connected to the first electrodes of the first assembly and a twelfth tab group connected to the first electrodes of the second assembly.

The eleventh tab group and the twelfth tab group may be bent and welded to the current collecting member.

The cap plate may further include a current collecting portion protruding toward the electrode assembly so as to be connected to the uncoated region tabs of the second electrodes.

The second electrode terminal may protrude outwards from the cap plate.

The electrode assembly may include a first assembly and a second assembly arranged side by side along the width of the cap plate, and the uncoated region tabs of the first electrodes may include a twenty-first tab group connected to the second electrodes of the first assembly and a twenty-second tab group connected to the second electrodes of the second assembly.

The twenty-first tab group and the twenty-second tab group may be bent and welded to the current collecting member.

Advantageous Effects

According to an exemplary embodiment of the present invention, the rechargeable battery may have a simple configuration since the vent plate is formed integrally with the vent hole of the cap plate. In this case, since the vent plate is formed beyond the thickness of the cap plate, only the vent plate may be heat-treated, thereby eliminating the increased brittleness of the vent plate caused by the coining process.

DESCRIPTION OF THE DRAWINGS

FIG. 1 is a perspective view of a rechargeable battery according to an exemplary embodiment of the present invention.

FIG. 2 is a cross-sectional view taken along the line II-II of FIG. 1.

FIG. 3 is a perspective view of an electrode assembly applied to FIG. 2.

FIG. 4 is a cross-sectional view taken along the line IV-IV of FIG. 1.

FIG. 5 is a cross-sectional view taken along the line V-V of FIG. 1.

FIG. 6 is a cross-sectional view of a vent plate formed integrally with a vent hole in a cap plate.

MODE FOR INVENTION

Hereinafter, the present inventive concept will be described in detail with reference to the accompanying drawings so that those skilled in the technical field to which the present inventive concept pertains may easily carry out the present inventive concept. As those skilled in the art would realize, the described embodiments may be modified in various different ways, all without departing from the scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or indirectly coupled to the other element through a third element. In addition, unless explicitly described to the contrary, the word "comprise" and variations such as "comprises" or "comprising", will be understood to imply the inclusion of stated elements but not the exclusion of any other elements.

FIG. 1 is a perspective view of a rechargeable battery according to an exemplary embodiment of the present invention. FIG. 2 is a cross-sectional view taken along the line II-II of FIG. 1. Referring to FIG. 1 and FIG. 2, a rechargeable battery according to an exemplary embodiment includes an electrode assembly 10 for performing current charging and discharging operations, a case 30 for accommodating the electrode assembly 10, a cap plate 40 attached to an opening 31 of the case 30, and first and second electrode terminals 51 and 52 electrically connected to the electrode assembly 10.

The case 30 provides a space for accommodating a plate-shaped electrode assembly 10 and an electrolyte solution. For example, the case 30 is approximately cuboidal, and has a rectangular opening 31 at one side to insert the electrode assembly 10.

The cap plate 40 is attached to the opening 31 of the case 30 to close and seal the case 30. In an example, the case 30 and the cap plate 40 may be formed from aluminum and welded together at the opening 31.

A top insulator 20 is disposed between the electrode assembly 10 and the cap plate 40. The top insulator 20 is formed from an electric insulating material and electrically insulates the electrode assembly 10 and the cap plate 40.

FIG. 3 is a perspective view of an electrode assembly applied to FIG. 2. Referring to FIG. 2 and FIG. 3, the electrode assembly 10 is formed by disposing a first electrode 11 (e.g., negative electrode) and a second electrode 12 (e.g., positive electrode) on either side of each separator 13, which is an electrical insulating material, and spirally winding or stacking (not shown) the negative electrode 11, separator 13, and positive electrode 12.

The positive and negative electrodes 11 and 12 include coated regions 111 and 121 here an active material is coated on a current collecting portion formed of a metal foil (e.g., copper or aluminum foil), and uncoated region tabs 112 and 122 where the active material is not coated thereon to expose the current collecting portion. The uncoated region tabs 112 and 122 are disposed at one end of the electrode assembly 10.

That is, the uncoated region tabs 112 of the negative electrodes 11 are disposed on one side (the left side of FIG. 4) of one end (the top of FIG. 3) of the electrode assembly 10, and the uncoated region tabs 122 of the positive electrodes 12 are spaced apart at the same end (the top of FIG. 3) of the electrode assembly 10 and disposed at different positions (on the right side of FIG. 3).

Moreover, the electrode assembly 10 is formed with a plurality of uncoated region tabs 112 and 122 to allow charge and discharge currents to flow, thereby reducing the overall resistance of the uncoated region tabs 112 and 122. Accordingly, the electrode assembly 10 may charge and discharge a high electrical current through the uncoated region tabs 112 and 122.

Although the electrode assembly 10 may be formed as a single unit, it may be formed as two units in the present exemplary embodiment. That is, the electrode assembly 10 includes a first assembly 101 and second assembly 102 arranged side by side along the width (x axis) of the cap plate 40 and connected in parallel. Moreover, the first and second assemblies 101 and 102 may be formed in the shape of a plate that forms a semicircle at both opposite ends along the y axis so that they are accommodated in an approximately cuboidal case 30.

FIG. 4 is a cross-sectional view taken along the line IV-IV of FIG. 1. Referring FIG. 2 to FIG. 4, the first electrode terminal 51 is installed in a terminal hole H formed through the cap plate 40, and electrically connected to the first and second assemblies 101 and 102 through the uncoated region tabs 112 of the first electrodes 11.

The uncoated region tabs 112 may be formed in a plurality of groups. The uncoated region tabs 112 bypass the outer side of the top insulator 20 along the width (x axis) of the cap plate 40 and are connected to the first electrode terminal 51 along the width (x axis).

In an exemplary embodiment, the uncoated region tabs 112 of the first electrodes 11 include a first tab group G11 and a second tab group G12. The first tab group G11 is connected to the first electrodes 11 of the first assembly 101, and the second tab group G12 is connected to the first electrodes 11 of the second assembly 102.

The first electrode terminal 51 includes a rivet portion 512, an internal plate 511, and an external plate 513. The first electrode terminal 51 is electrically insulated from the cap plate 40, with a gasket 621 placed between it and the cap plate 40.

The gasket 621 is installed between the rivet portion 512 of the first electrode terminal 51 and the inner surface of the terminal hole H of the cap plate 40, and seals the gap between the rivet portion 512 and the terminal hole H of the cap plate 40 and electrically insulates them.

By inserting the rivet portion 512 into the terminal hole H, with the gasket 621 filling the gap in between, inserting it through a fastening hole 514 of the external plate 513, with an external insulating member 631 placed between the external plate 513 and the cap plate 40, and then caulking or welding the perimeter of the fastening hole 514, the rivet portion 512 is fixed to the external plate 513. As such, the first electrode terminal 51 may be installed to the cap plate 40.

Thus, the rivet portion 512 is installed in the terminal hole H and protrudes outwards from the cap plate 40. The rivet portion 512 is connected to the internal plate 511 inside the cap plate 40, and connected to the external plate 513 outside the cap plate 40. That is, the rivet portion 512 mechanically and electrically connects the internal plate 511 and the external plate 513 together.

The internal plate 511 is connected to a current collecting member 515 inside the cap plate 40. The current collecting member 515 is connected to the uncoated region tabs 112. That is, the uncoated region tabs 112 are welded to the current collecting member 515, and the current collecting member 515 is welded to the internal plate 511.

At this point, the uncoated region tabs 112 of the first electrodes 11 in the first and second assemblies 101 and 102 are divided into a first tab group G11 and a second tab group G12 to bypass the lateral side of the top insulator 20 at first and second sides, and are bent and welded to the current collecting member 515. Accordingly, the first and second assemblies 101 and 102 may be drawn out of the case 30 through the uncoated region tabs 112 of the first electrodes 11, the current collecting member 515, and the first electrode terminal 51.

FIG. 5 is a cross-sectional view taken along the line V-V of FIG. 1. Referring to FIG. 2, FIG. 3, and FIG. 5, the second electrode terminal 52 is formed integrally with the cap plate 40 and electrically connected to the first and second assemblies 101 and 102 through the uncoated region tabs 122 of the second electrodes 12.

To this end, the cap plate 40 further includes a current collecting portion 525 formed integrally with it. The current collecting portion 525 protrudes toward the electrode assembly 10 so as to be connected to the uncoated region tabs 122 of the second electrodes 12. In an example, the current collecting portion 525 may be formed on the cap plate 40 by a coining process.

The uncoated region tabs 122 may be formed in a plurality of groups. The uncoated region tabs 122 bypass the outer side of the top insulator 20 along the width (x axis) of the cap plate 40 and are connected to the second electrode terminal 52 through the current collecting portion 525 and the cap plate 40 along the width (x axis).

In an exemplary embodiment, the uncoated region tabs 122 of the second electrodes 12 include a first tab group G21 and a second tab group G22. The first tab group G21 is connected to the second electrodes 12 of the first assembly 101, and the second tab group G22 is connected to the second electrodes 12 of the second assembly 102.

The current collecting portion 525 is connected to the uncoated region tabs 122 of the second electrodes 12. That is, the uncoated region tabs 122 are welded to the current collecting portion 525, the current collecting portion 525 is formed integrally with the cap plate 40, and the cap plate 40 is formed integrally with the second electrode terminal 52.

At this point, the uncoated region tabs 122 of the second electrodes 12 in the first and second assemblies 101 and 102 are divided into a first tab group G21 and a second tab group G22 to bypass the lateral side of the top insulator 20 at first and second sides, and are bent and welded to the current collecting portion 525. Accordingly, the first and second assemblies 101 and 102 may be drawn out of the case 30 through the uncoated region tabs 122 of the second electrodes 12, the current collecting portion 525, and the second electrode terminal 52.

In an example, the second electrode terminal 52 may be formed on the cap plate 40 by a coining process. That is, the second electrode terminal 52 protrudes outwards from the cap plate 40 which is in the opposite direction to the direction the current collecting portion 525 protrudes.

The current collecting portion 525 and second electrode terminal 52 which are integrally formed by the coining process may need less elements and simplify the structure compared to the current collecting member 515 and first electrode terminal 51 connected to the first electrodes 11.

Referring again to FIG. 1 to FIG. 3, the cap plate 40 further includes an electrolyte injection opening 42 and a vent hole 41. The electrolyte injection opening 42 allows for injection of an electrolyte solution into the case 30 after the cap plate 40 is attached and welded to the case 30. After the injection of an electrolyte solution, the electrolyte injection opening 42 is sealed with a sealing closure 421.

The top insulator 20 has an internal electrolyte injection opening 28. Since the internal electrolyte injection opening 28 is formed corresponding to the electrolyte injection opening 42 formed in the cap plate 40, it facilitates the injection of an electrolyte solution passing through the electrolyte injection opening 42 into the top insulator 20.

The vent hole 41 is formed to release an internal pressure caused by a gas generated in the rechargeable battery by charging and discharging operations of the electrode assembly 10, and is closed and sealed with a vent plate 411.

In an example, the vent hole 41 and the vent plate 411 are formed integrally with the cap plate 40 by a coining process. The vent hole 41 and the vent plate 411 may need less elements and simplify the structure compared to a configuration in which the vent plate is manufactured separately and welded to the vent hole.

When the internal pressure of the rechargeable battery reaches a set pressure, the vent plate 411 is cut open to open the vent hole 41 and release a gas generated by overcharging and the internal pressure. To this end, the vent plate 411 has a notch 412 that guides the cutting of it.

The top insulator 20 has an internal vent hole 27. Since the internal vent hole 27 is formed corresponding to the vent hole 41 formed in the cap plate 40, it delivers an internal pressure lifting from a gas generated from the electrode assembly 10 to the vent hole 41 and facilitates the release of it.

FIG. 6 is a cross-sectional view of a vent plate formed integrally with a vent hole in a cap plate. Referring to FIG. 2 and FIG. 6, the vent plate 411 is formed beyond the thickness T of the cap plate 40 by a coining process. That is, the vent plate 411 is protruded by a set height H1 as if by pushing the inner surface of the cap plate 40 down towards the electrode assembly 10.

As the vent plate 411 is positioned beyond the thickness T of the cap plate 40, unnecessary heat transfer around the vent plate 411 may be prevented when the vent plate 411 is heat-treated to eliminate the brittleness of the vent plate 411 caused by coining.

That is, unnecessary heat deformation of the cap plate 40 around the vent plate 411 and the vent hole 41 may be prevented. In an example, the heat treatment of the vent plate can be done by high-frequency heating, by which brittleness—that is, work hardening—may be eliminated.

Meanwhile, a high reduction rate in the coining process increases brittleness and lowers the durability of the vent plate 411. Accordingly, the cap plate 40 is sloped at a set angle $\theta$ with respect to the thickness direction (z-axis direction) to enhance the durability of the vent plate 411—that is, to lower the reduction rate. The angle $\theta$ used in the coining process makes it easy to expand the peripheral areas of the vent hole 41 and vent plate 411 on the cap plate 40. In an example, the angle $\theta$ may be 45 degrees, plus or minus 15 degrees.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims <Description of symbols>

10: electrode assembly
11, 12: first and second electrodes (negative and positive electrodes)
13: separator
20: top insulator
27: internal vent hole
28: internal electrolyte injection opening
30: case
31: opening
40: cap plate
41: vent hole
42: electrolyte injection opening
51, 52: first electrode terminal
101, 102: first and second assemblies
111, 121: coated region
112, 122: uncoated region tab
411: vent plate
412: notch
421: sealing closure
511: internal plate
512: rivet portion
513: external plate
514: fastening hole
515: current collecting member
525: current collecting portion
621: gasket
631: external insulating member
G11, G21: first tab group
G12, G22: second tab group
H: terminal hole
H1: height
T: thickness
θ: angle

The invention claimed is:

1. A rechargeable battery comprising:
one or more separators;
an electrode assembly formed by disposing first and second electrodes on either side of each of the one or more separators, the first and second electrodes each having coated regions and uncoated region tabs;
a case for accommodating the electrode assembly;
a cap plate attached to an opening of the case to close and seal the case and having a vent plate formed integrally with a vent hole;
a first electrode terminal connected to the uncoated region tabs of the first electrodes and installed with a gasket placed in a terminal hole of the cap plate; and
a second electrode terminal connected to the uncoated region tabs of the second electrodes and formed integrally with the cap plate,
wherein the vent plate is formed beyond a thickness of the cap plate,
wherein the cap plate further comprises a current collecting portion formed integrally with the cap plate, the current collecting portion protruding toward the electrode assembly so as to be connected to the uncoated region tabs of the second electrodes,
wherein the second electrode terminal is spaced from the first electrode terminal in an extending direction of the cap plate, and
wherein an entirety of the current collecting portion is spaced from the second electrode terminal in the extending direction between the vent plate and the second electrode terminal to protrude from the cap plate toward the electrode assembly.

2. The rechargeable battery of claim 1, wherein the vent plate protrudes toward the electrode assembly by a height from an inner surface of the cap plate.

3. The rechargeable battery of claim 1, wherein
the first electrode terminal comprises:
a rivet portion installed with the gasket placed in the terminal hole;
an external plate installed around an exposed end of the rivet portion and connected to the rivet portion; and
an internal plate integrally connected to an underside of the rivet portion and connected to the uncoated region tabs of the first electrodes, with a current collecting member in between the internal plate and the uncoated region tabs of the first electrodes.

4. The rechargeable battery of claim 3,
the electrode assembly comprises a first assembly and a second assembly arranged side by side along a width of the cap plate, and
the uncoated region tabs of the first electrodes comprise an eleventh tab group connected to the first electrodes of the first assembly and a twelfth tab group connected to the first electrodes of the second assembly.

5. The rechargeable battery of claim 4, wherein the eleventh tab group and the twelfth tab group are bent and welded to the current collecting member.

6. The rechargeable battery of claim 1, wherein the second electrode terminal protrudes outwards from the cap plate.

7. The rechargeable battery of claim 1, wherein
the electrode assembly comprises a first assembly and a second assembly arranged side by side along a width of the cap plate, and
the uncoated region tabs of the first electrodes comprise a twenty-first tab group connected to the second electrodes of the first assembly and a twenty-second tab group connected to the second electrodes of the second assembly.

8. The rechargeable battery of claim 7, wherein the twenty-first tab group and the twenty-second tab group are bent and welded to a current collecting member.

9. The rechargeable battery of claim 1, wherein a surface of the cap plate corresponding to the vent hole is sloped with respect to a thickness direction of the cap plate at an angle in a range of 30 degrees to 60 degrees.

10. The rechargeable battery of claim 1, wherein the vent plate overlaps with the vent hole in a thickness direction of the cap plate, and protrudes toward the electrode assembly from the vent hole.

* * * * *